March 6, 1956     I. WOLFF     2,737,585
SUPER-HIGH FREQUENCY RADIO GENERATOR
Filed April 30, 1952
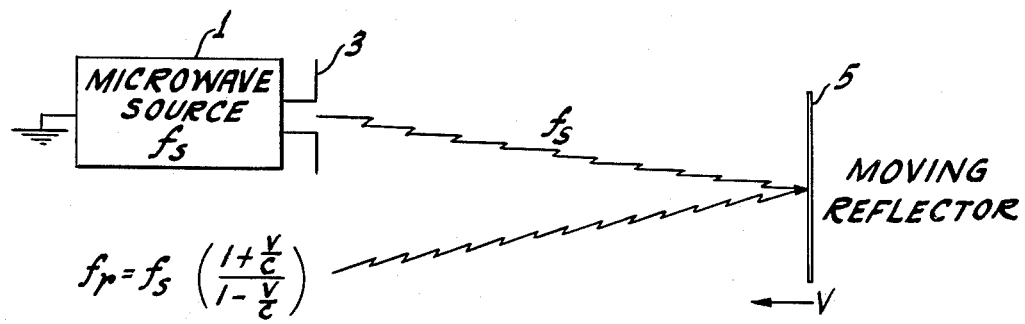
*Fig_1*
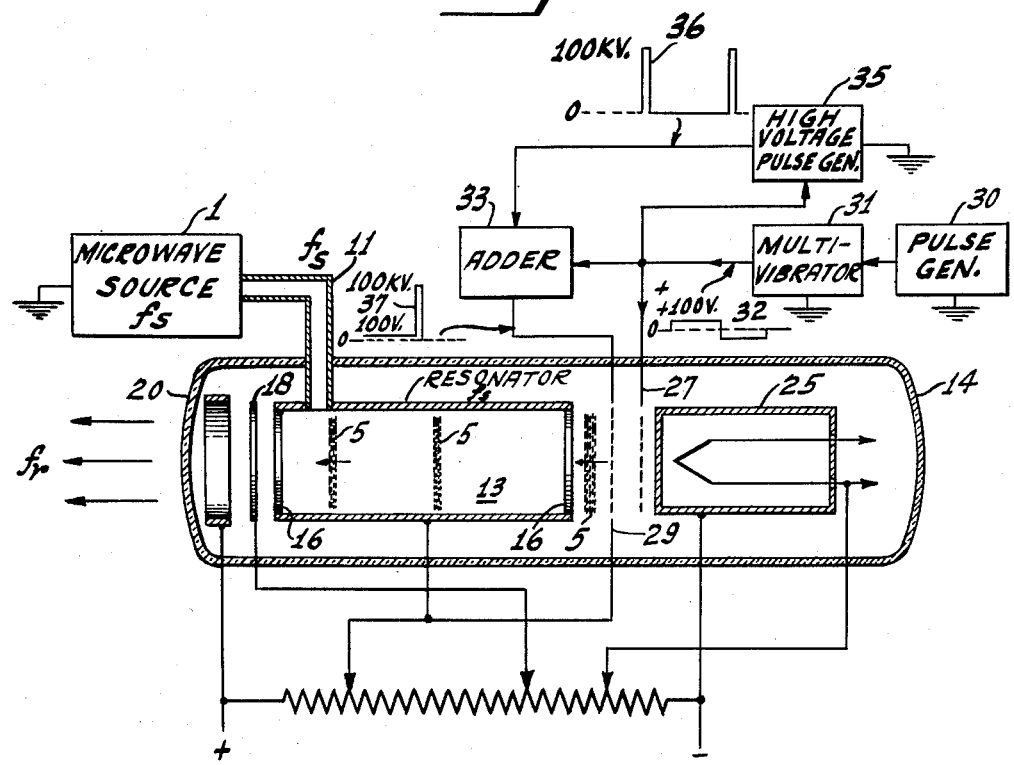
*Fig_2*
*Fig_3*
INVENTOR
*Irving Wolff*
BY
ATTORNEY

2,737,585

SUPER-HIGH FREQUENCY RADIO GENERATOR

Irving Wolff, Princeton, N. J., assignor, by mesne assignments, to the United States of America as represented by the Secretary of the Army Application April 30, 1952, Serial No. 285,172

5 Claims. (Cl. 250—36)

This invention relates generally to microwave energy devices and more particularly to improved methods of and means for generating super-high frequency waves.

Certain presently known microwave generators such as klystrons and magnetrons are moderately satisfactory for generating wave signals near the centimeter wave region but generally are unsatisfactory for the generation of millimeter waves. One problem encountered is in properly scaling down the sizes of both the klystron and the magnetron for millimeter wave operation. Mechanical tolerances which are satisfactory for relatively low frequency operation are proportionately greater and cause difficulty in similar smaller devices designed for operation at relatively higher frequencies. Also, in the magnetron, high strength uniformly distributed magnetic fields are required. Near the millimeter wave region, these field strengths are attained only with difficulty and the tubes become extremely small. In the klystron, at these high frequencies, the unloaded Q of the cavity resonators thereof is extremely low. The loaded Q and the shunt resistance of the device are even lower. At K-band frequencies (approximately 24,000 megacycles), for example, the klystron cavity Q may be as low as five hundred and at one millimeter wave lengths is much lower.

In accordance with the present invention, a cavity resonator is excited with microwave energy at some selected frequency in or near the centimeter wave region. A plurality of charged particle concentrations are successively generated outside the resonator and projected therethrough at a velocity which is a substantial portion of the velocity of light. The centimeter wave energy in the resonator reflected from the rapidly moving charged particle concentrations is then raised to the millimeter wave frequency region as a result of Doppler effect.

An object of the invention is to provide improved methods of and means for generating super-high frequency radio energy.

Another object of the invention is to provide more efficient methods of and means for changing the frequency of microwave energy.

Another object of the invention is to provide improved means for continuously deriving millimeter wave energy from centimeter wave energy.

A further object of the invention is to raise the frequency of centimeter wave signals as a function of Doppler to produce millimeter wave signals.

The invention will be described in detail with reference to the accompanying drawing in which Figure 1 is a schematic block diagram, of microwave apparatus, the description of the operation of which will be helpful in understanding the teachings of the invention; Figure 2 is a schematic diagram, partially in block form, of a millimeter wave generator, according to the invention; and Figure 3 is a diagram of an end section of a cavity resonator excited in the TE$_{0,1}$ mode and utilized in the wave generator of Figure 2.

Similar reference characters are applied to similar elements throughout the drawing.

Referring to Figure 1, a source 1 radiates microwave energy at a frequency of $f_s$ from an antenna 3, preferably directive in characteristic, toward a reflector 5. The reflector 5 to which the wave energy at frequency $f_s$ is directed is moved rapidly toward the source 1 at velocity $v$. The energy reflected in this manner is then raised in frequency as a function of Doppler to $$f_r = f_s \left( \frac{1 + \frac{v}{c}}{1 - \frac{v}{c}} \right)$$

where $f_r$ is a frequency greater than $f_s$ and $c$ is the velocity of light. The energy at frequency $f_r$ which is reflected in the manner described above is $$\left(1 + \frac{v}{c}\right)$$

times as great as that which may be obtained with a source operating at a frequency of $f_s$ and moving with a velocity of $v$. When $f_s$ is high, as in the centimeter wave region, and when the velocity of the moving reflector is a substantial portion of the velocity of light, the reflected Doppler frequency wave signals are considerably enhanced in frequency. For example, if the reflector 5 moves at three-fourths the velocity of light, the frequency of the reflected energy, $f_r$, is $7f_s$.

In Figure 2 a typical embodiment, according to the invention, is shown wherein centimeter wave energy may be converted to millimeter wave energy in accordance with the principles outlined above. Centimeter wave energy (at frequency $f_s$) from a microwave source 1 is coupled by means of a hollowpipe waveguide 11 to a cavity resonator 13. The resonator is contained within an evacuated envelope 14 and is tuned to resonate at frequency $f_s$. The reflectors 5 each comprise one of a number of concentrations of charged particles in the form of thin disks of electrons which successively are impelled through the resonator with a velocity preferably greater than one-half the velocity of light. The structure for generating these disks of electrons will be described later. The centimeter wave energy ($f_s$) travelling to and fro within the resonator 13 is reflected by one or more of these electron disks 5 which successively are impelled through the resonator to provide output signal energy at the Doppler increased frequency $f_r$. Energy at frequency $f_r$ may be derived substantially continuously by suitably selecting the repetition rate for generating the electron disks to produce disks having a separation between successive ones thereof not greater than $$\left(1 - \frac{v}{c}\right) l$$

where $v$ is the velocity of travel of the electron disks through the resonator, $c$ is the velocity of travel of light in the medium within the resonator, and $l$ is the axial length of the resonator. Under these conditions, the time spacing between successive disks is $$l \left( \frac{1}{v} - \frac{1}{c} \right)$$

With the disk separation greater than indicated above, super-high frequency energy may be obtained in pulses of this time length $$l \left( \frac{1}{v} - \frac{1}{c} \right)$$

and having a repetition rate the same as the disk repetition rate. If the disks are spaced closer than $$l \left(1 - \frac{v}{c}\right)$$

very accurate spacing must be maintained therebetween to avoid destructive interference in the desired direction of radiation of the energy reflected by successive disks. The same requirement must also be met if coherence between the radiations of energy reflected from the successive disks is desired. It is preferred, however, that the disk repetition rate be such that energy may be derived substantially continuously at the Doppler frequency $f_r$.

The end sections 16 of the resonator 13 are designed to allow the electron disks to pass axially through the resonator. In the present example it will be assumed that the resonator has been excited in the $TE_{0,1}$ mode. Thus end section 16 comprises a plurality of concentric metallic rings supported preferably in an equi-spaced relation by radial non-reflective non-metallic support members 17 such as mica. The concentric rings are spaced less than one-half wavelength apart at the input frequency $f_s$ but greater than one-half wavelength apart at the Doppler frequency $f_r$. Each end section then is permeable to the electron disk and to the Doppler increased frequency $f_r$ but substantially opaque to the input signal frequency $f_s$. If it is desirable to excite the resonator 13 in a different mode, the configuration of the resonator end sections must be changed accordingly so that the metallic elements comprising the resonator end sections 16 couple to the electric lines of force excited within the resonator.

The concentration of the electrons comprising a given disk 5 is such that the disk reflects only a portion of the energy at frequency $f_s$ which is incident thereto. The disk then does not act as a solid reflector and the movement thereof through the resonator 13 does not detune the resonator and has negligible effect upon its Q. With attainable electron densities, the reflection of energy from the moving disks is a small proportion of the energy incident thereon. In the present example the reflection coefficient of the disks is less than one percent and may be one-tenth of one percent or less. To a first order approximation, the energy at frequency $f_s$ which is travelling to and fro in the resonator, the resonator being excited with energy from the source 1 at a given power, is proportional to the Q of the resonator. Since the super-high frequency energy ($f_r$) is substantially proportional to the energy at frequency $f_s$, it is important that the particular resonator used in the present system be designed to have as high a Q as possible.

After a particular electron disk has completed its transit through the resonator, the high rate of travel of the disk requires that the velocity thereof be retarded so that the electron particles comprising the disk may be collected. To this end a decelerating electrode 18 is provided which is connected to a low potential relative to the potential to which the resonator 13 is connected. The decelerating electrode 18 preferably is similar in configuration to the resonator end sections in order that substantially all the super-high frequency energy at frequency $f_r$ may pass therethrough. Also, the decelerating electrode sufficiently slows and reduces the velocities of the individual electrons comprising the disk to a value such that the disk begins to diffuse. The electrons then may be readily collected either at various high potential points with the envelope 14 or by a collector electrode 20.

The electron gun for generating the electron disks is disposed within the evacuated envelope 14 and comprises a thermionic cathode 25 having a flat surface providing substantially uniform emission thereover, a control electrode 27, and an accelerating electrode 29. The cathode may be of the type known as an L-cathode such as is described in an article by G. A. Espersen appearing at page 284 of the March 1952 issue of the Proceedings of the I. R. E. Initially the control grid 27 is maintained sufficiently negative with respect to the cathode 25 to prevent the flow of an electron current. A pulse generator 30 produces pulse signals at a predetermined pulse repetition rate which trigger a multivibrator 31. The multivibrator 31 produces a substantially square wave output signal 32 having a positive going excursion of approximately 100 volts which, when applied to the control grid 27, permits electrons to begin to diffuse into the space between the control and accelerating electrodes 27 and 29. The 100 volt square wave signal is also applied to the accelerating electrode 29 through an adder circuit 33 in order that there be no electrostatic field set up between the electrodes 27 and 29. The multivibrator output signal 32 is also applied to a high voltage pulse generator 33, the trailing edge of the multivibrator square wave pulse keying the high voltage generator 35 to produce an accelerating pulse 36 having an amplitude of the order of a hundred kilovolts. The high voltage pulse is then combined with the multivibrator signal in the adder circuit 33 to produce a composite signal as indicated by the numeral 37.

The pulse duration of the positive-going portion of the multivibrator signal is chosen to allow electrons to penetrate the control grid 27 to occupy a space which may extend approximately half the distance from the accelerating electrode 29. At the time at which the one hundred kilovolt pulse is applied to the accelerator electrode 29, the control grid 27 is driven negatively by the negative portion of the multivibrator signal and cuts off the further diffusion into this region of electrons from the cathode. The electrons nearest to the accelerator electrode 29 are accelerated a given amount while electrons located further toward the control grid are subjected to the one hundred kilovolt electrostatic field for a relatively longer time than those closer to the accelerator and are accelerated a greater amount. The effect of this differential acceleration is to form the relatively unconcentrated space charge of electrons into a thin highly concentrated disk of electrons by the time that the electrons enter the resonator 13.

What is claimed is:

1. A super-high frequency generator comprising, connection means for a source of microwave energy having a frequency lower than said super-high frequency, a hollow cylindrical structure resonant at the frequency of said microwave energy coupled to said microwave source connection means including electrodes bounding the ends of said structure which are reflecting to the waveguide mode of said microwave energy, electron beam generating means, means for pulsing said generated beam to provide successive movable electron concentrations, means for accelerating said successive electron concentrations through said electrodes and said resonant structure toward said microwave source connection means at a velocity which is a substantial portion of the velocity of light to Doppler-shift the frequency of said microwave energy, and means responsive to energy reflected by said concentrations through said hollow structure for continuously deriving super-high frequency energy at said Doppler-shifted frequency.

2. Apparatus according to claim 1 wherein said electron beam generating means and said beam pulsing means comprise means for generating successive disk shaped concentrations of electrons, each disk shaped electron concentration reflecting less than one percent of said microwave energy.

3. Apparatus according to claim 1 wherein said electron beam generating means and said beam pulsing means comprise means for generating electron concentrations having a relatively low coefficient of reflection of said microwave energy, said electron concentrations reflecting less than one percent of said microwave energy.

4. Apparatus according to claim 1 wherein said electron beam generating means and said beam pulsing means comprise means for generating electron concentrations having a relatively low coefficient of reflection of said microwave energy, said electron concentrations reflecting less than one-tenth of one percent of said microwave energy.

5. Apparatus according to claim 1 wherein said beam pulsing means comprise means for pulsing said beam at a rate which is substantially $$l\left(\frac{1}{v}-\frac{1}{c}\right)$$

where $l$ is the axial length of said resonant structure, $v$ is the velocity of travel of said particle concentrations through said resonant structure, and $c$ is the velocity of travel of light.

References Cited in the file of this patent

UNITED STATES PATENTS

| | | |
|---|---|---|
| 2,391,914 | McElhannon | Jan. 1, 1946 |
| 2,467,455 | Aurell | Apr. 19, 1949 |
| 2,535,274 | Dicke | Dec. 26, 1950 |
| 2,576,696 | Ramo | Nov. 27, 1951 |